US011588780B2

(12) United States Patent
Tachi et al.

(10) Patent No.: US 11,588,780 B2
(45) Date of Patent: Feb. 21, 2023

(54) POSTING RIGHT GIVING DEVICE, POSTING RIGHT GIVING METHOD, AND COMPUTER READABLE MEDIUM STORING POSTING RIGHT GIVING PROGRAM

(71) Applicant: Rakuten Group, Inc., Tokyo (JP)

(72) Inventors: Yutaka Tachi, Tokyo (JP); Haruna Takada, Tokyo (JP)

(73) Assignee: Rakuten Group, Inc., Tokyo (JP)

(*) Notice: Subject to any disclaimer, the term of this patent is extended or adjusted under 35 U.S.C. 154(b) by 56 days.

(21) Appl. No.: 17/375,438

(22) Filed: Jul. 14, 2021

(65) Prior Publication Data

US 2022/0038415 A1 Feb. 3, 2022

(30) Foreign Application Priority Data

Jul. 31, 2020 (JP) .............................. JP2020-130692

(51) Int. Cl.
*H04L 51/52* (2022.01)
*H04N 1/00* (2006.01)
(Continued)

(52) U.S. Cl.
CPC ............ *H04L 51/52* (2022.05); *G06F 16/587* (2019.01); *H04L 63/102* (2013.01); *H04N 1/00323* (2013.01); *H04N 2201/3253* (2013.01)

(58) Field of Classification Search
CPC ..... H04L 51/52; H04L 63/102; G06F 16/587; H04N 1/00323; H04N 2201/3253; H04N 2201/3225
See application file for complete search history.

(56) References Cited

U.S. PATENT DOCUMENTS 8,312,087 B2 * 11/2012 Svendsen .............. H04L 51/214
382/118
2011/0022529 A1 * 1/2011 Barsoba ................ G06F 16/434
707/E17.108
(Continued)

FOREIGN PATENT DOCUMENTS

CN 108027827 A 5/2018
JP 2010-055222 A 3/2010
(Continued)

*Primary Examiner* — Jeong S Park
(74) *Attorney, Agent, or Firm* — Sughrue Mion, PLLC

(57) ABSTRACT

A posting right giving device acquires, from a terminal device, a photographed image to which positional information indicating a photographing position of the image is added. The device acquires position history information indicating a history of positions of the terminal device. The device acquires, from a storage, region information indicating a region designated in advance for a community where information can be posted and posted information can be received via a network. The device executes, on the basis of determination that the photographing position indicated by the positional information added to the acquired image is included in the region indicated by the acquired region information and the photographing position corresponds to a position of the terminal device identified on the basis of the acquired position history information, processing forgiving a user of the terminal device a right to post information to the community.

7 Claims, 10 Drawing Sheets

(51) Int. Cl.
   *H04L 9/40*       (2022.01)
   *G06F 16/587*     (2019.01)

(56) References Cited

U.S. PATENT DOCUMENTS

| | | | |
|---|---|---|---|
| 2012/0198570 A1* | 8/2012 | Joa | G06F 21/6218 726/30 |
| 2013/0117389 A1 | 5/2013 | Yamada et al. | |
| 2016/0004880 A1* | 1/2016 | Collins | G06F 21/31 726/28 |
| 2018/0041545 A1* | 2/2018 | Chakra | G06Q 50/01 |
| 2018/0337917 A1* | 11/2018 | Wallace | G06V 40/70 |
| 2019/0012382 A1 | 1/2019 | Minkovicz et al. | |
| 2022/0012282 A1 | 1/2022 | Minkovicz et al. | |

FOREIGN PATENT DOCUMENTS

| | | |
|---|---|---|
| JP | 5686087 B2 | 3/2015 |
| JP | 6196316 B2 | 9/2017 |
| JP | 6411800 B2 | 10/2018 |
| TW | 201614568 A | 4/2016 |
| WO | 2017/009851 A2 | 1/2017 |

\* cited by examiner

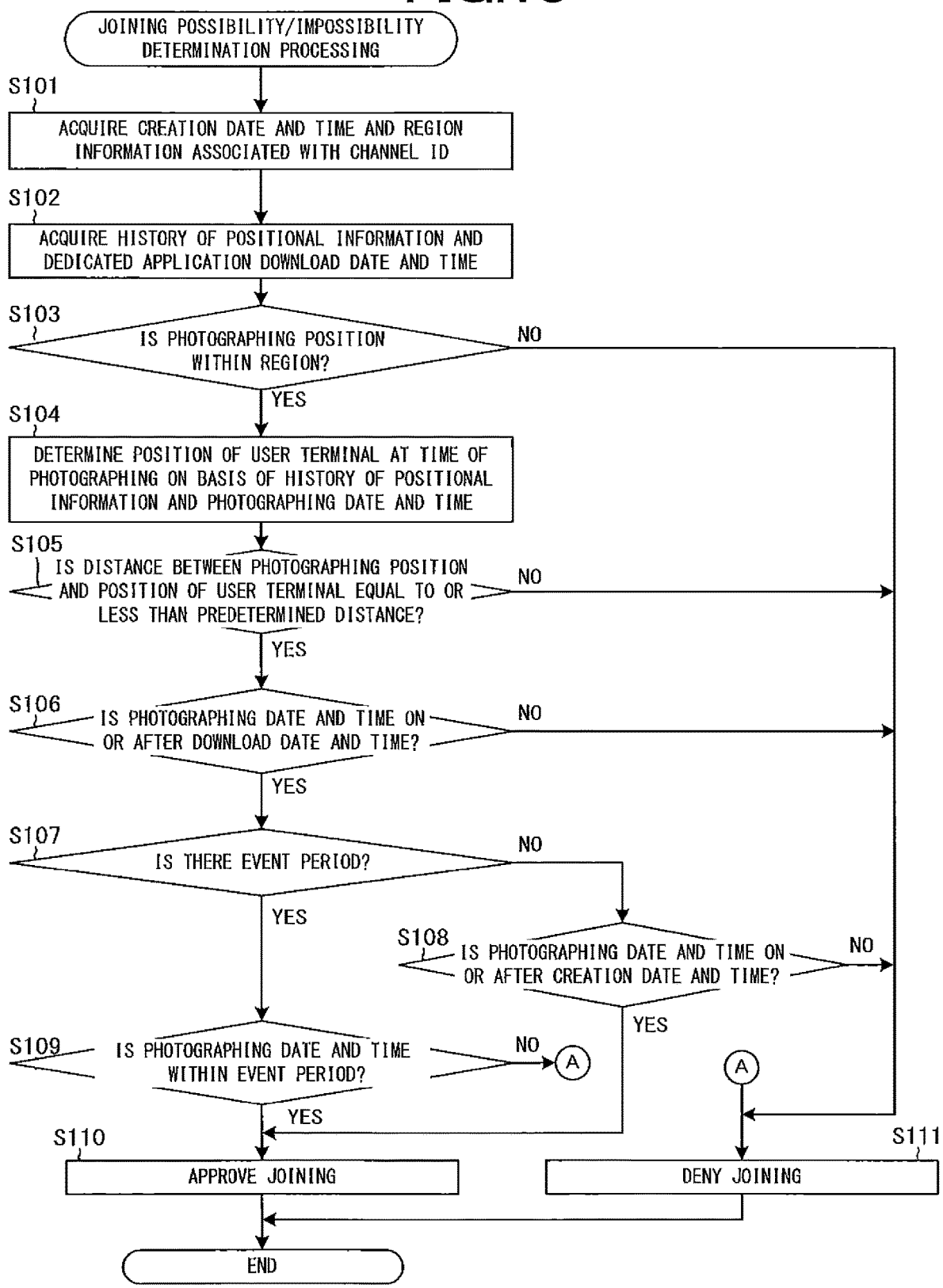

POSTING RIGHT GIVING DEVICE, POSTING RIGHT GIVING METHOD, AND COMPUTER READABLE MEDIUM STORING POSTING RIGHT GIVING PROGRAM

CROSS-REFERENCE TO RELATED PATENT APPLICATION

This application claims priority from Japanese Patent Application No. 2020-130692 filed Jul. 31, 202, the entire disclosure of which, including the specification, the scope of claims, drawings, and abstract, is incorporated herein by reference in their entirety.

BACKGROUND

Technical Field

The present invention relates to a technical field of a method of using an image to which positional information indicating a photographing position of the image is added for processing related to a community on a network.

Related Art

Currently, systems that enable information exchange between users via a network have come into wide use such as, for example, social networking services (SNS) (for example, JP 2010-055222 A). Such a system allows access by specific or unspecific users to information posted by a certain user. In addition, it is generally possible to create an Internet community for the purpose of exchanging information between users who have common favorite things, interests, or the like. Usually, only users who have joined in the community can post information to the community.

Meanwhile, geotagging for adding geographical positional information to a specific type of content is known. For example, a terminal device such as a mobile phone has a function of acquiring positional information using a positioning system such as a global positioning system (GPS). The terminal device adds acquired positional information to content. With this positional information, it is possible to identify a position where specific something related to the content was done. For example, in a case where the content is an image such as a photo and a video, the positional information indicates a date and time when the image was photographed.

In relation to the above-described community and positional information, JP 6196316 B2 discloses a method of adjusting distribution of content on the basis of a post of a user. In this method, a geographic position associated with a posted photo is determined by identifying an object of the photo at a known place or by a position determination process such as a geotag. In addition, the post of the user is subjected to clustering on the basis of the time of the post, the subject of the post, and the geographical position. Then, the distribution amount of content of a subject similar to the subject of the post in a cluster is adjusted on the basis of the number of posts in the cluster.

SUMMARY

Incidentally, there is a case where regarding a community related to a specific place, it is desired to let only users who have gone to the place join the community. In that case, it is assumed that as a proof of having gone to the specific place, the user photographs an image at the place and uploads the image to which positional information of the place is added. However, it is easy to falsify the positional information added to the image. In addition, it is also possible to obtain an image to which the positional information is added from another person. Therefore, there is a possibility that a user who has not actually gone to the specific place joins the community by pretending to have gone to the place.

The present invention has been made in view of the above points, and an example of an object thereof is to provide a posting right giving device, a posting right giving method, and a computer readable medium storing a posting right giving program that allows users having high certainty of having gone to a place associated with a community to join the community by using an image to which positional information is added.

Solution to Problem

An aspect of the present invention is a posting right giving device, comprising: at least one memory configured to store thereon computer program code; and at least one processor configured to access the at least one memory and operate according to the computer program code, the computer program code comprising: image acquisition code configured to cause at least one of the at least one processor to acquire, from a terminal device, a photographed image to which positional information indicating a photographing position of the image is added; position history information acquisition code configured to cause at least one of the at least one processor to acquire position history information indicating a history of positions of the terminal device; region information acquisition code configured to cause at least one of the at least one processor to acquire, from a storage, region information indicating a region designated in advance for a community where information can be posted and posted information can be received via a network; and giving code configured to cause at least one of the at least one processor to execute, on the basis of determination that the photographing position indicated by the positional information added to the acquired image is included in the region indicated by the acquired region information and the photographing position corresponds to a position of the terminal device identified on the basis of the acquired position history information, processing for giving a user of the terminal device a right to post information to the community.

Another aspect of the present invention is a posting right giving method performable by a computer, the method comprising: acquiring, from a terminal device, a photographed image to which positional information indicating a photographing position of the image is added; acquiring position history information indicating a history of positions of the terminal device; acquiring, from a storage, region information indicating a region designated in advance for a community where information can be posted and posted information can be received via a network; and executing, on the basis of determination that the photographing position indicated by the positional information added to the acquired image is included in the region indicated by the acquired region information and the photographing position corresponds to a position of the terminal device identified on the basis of the acquired position history information, processing for giving a user of the terminal device a right to post information to the community.

Yet another aspect of the present invention is a non-transitory computer readable medium storing thereon a posting right giving program, the posting right giving program causing a computer to: acquiring, from a terminal device, a photographed image to which positional information indicating a photographing position of the image is added; acquiring position history information indicating a history of positions of the terminal device; acquiring, from a storage, region information indicating a region designated in advance fora community where information can be posted and posted information can be received via a network; and executing, on the basis of determination that the photographing position indicated by the positional information added to the acquired image is included in the region indicated by the acquired region information and the photographing position corresponds to a position of the terminal device identified on the basis of the acquired position history information, processing for giving a user of the terminal device a right to post information to the community.

BRIEF DESCRIPTION OF DRAWINGS

FIG. 10 is a flowchart showing one example of joining possible or impossible determination processing by the system controller of the center server according to one embodiment.

DETAILED DESCRIPTION

Embodiments of the present invention will be described in detail below with reference to the drawings. In the embodiments described below, each Internet community is referred to as a channel.

[1. Configuration of Channel System]

Figure 1:
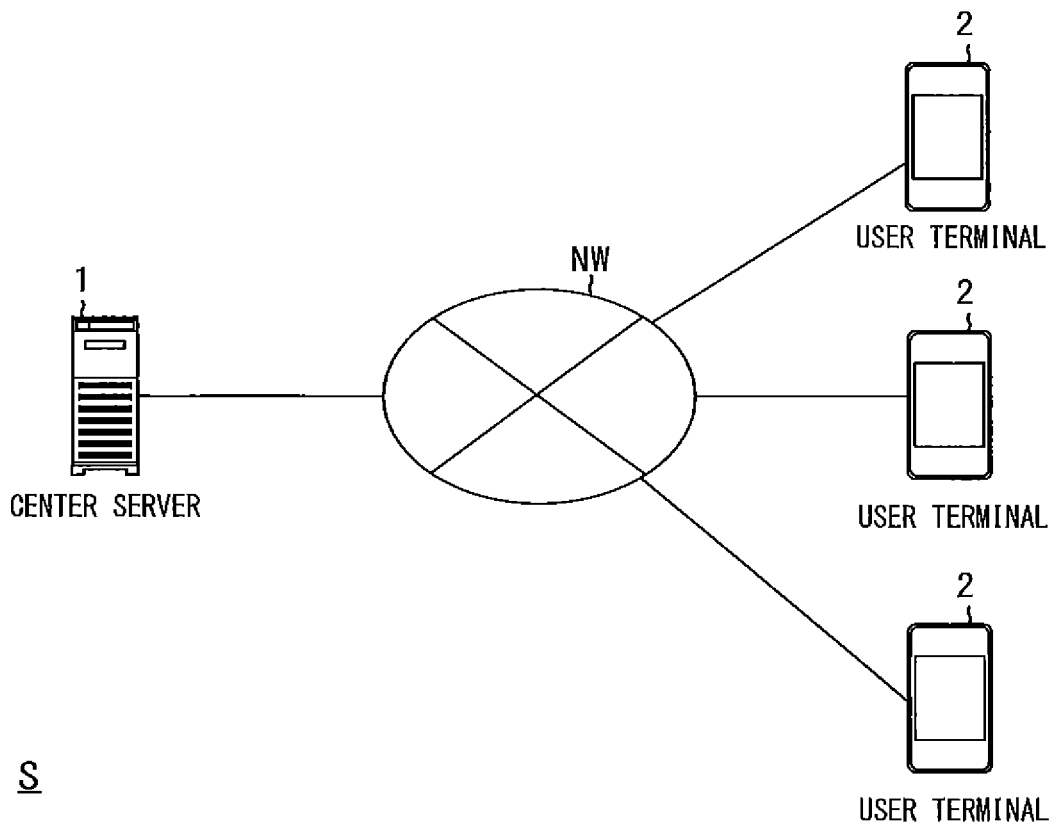
FIG. 1 is a diagram showing one example of a schematic configuration of a channel system according to one embodiment.

To begin with, a configuration and functional outline of a channel system S according to the present embodiment will be described with reference to FIG. 1. FIG. 1 is a diagram showing one example of the schematic configuration of the channel system S according to the present embodiment.

As shown in FIG. 1, the channel system S includes a center server 1 and a plurality of user terminals 2. The center server 1and each user terminal 2 are connected to each other via a network NW. The network NW includes, for example, the Internet, a dedicated communication line (for example, community antenna television (CATV) line), a mobile communication network (including base stations and the like), a gateway, and the like.

The center server 1 manages channels in which information is exchanged. Each member of the channel can post information to the channel and receive information posted to the channel via the network NW by using the user terminal 2. Examples of an information exchange method in the channel include a bulletin board method, a chat method, and the like. The center server 1 performs processing for controlling creation of the channel, user's joining the channel, exchange of information between users enrolled in the channel, and the like.

Each user terminal 2 is a portable terminal device to be used by a user who uses the channel system S. Examples of the user terminal 2 include a portable information terminal such as a smartphone and a tablet computer, a cellular phone, a personal digital assistant (PDA), and the like. Each user terminal 2 may store an application program dedicated to the channel system S. The dedicated application is used to post information to the channel. The user terminal 2 transmits and receives information to and from the center server 1 according to the dedicated application, whereby the user can use the channel system S. The dedicated application can be downloaded from the center server 1, for example.

Each user terminal 2 has a function of acquiring positional information indicating the position of the user terminal 2. For example, a satellite positioning system such as global positioning system (GPS) may be used to calculate the latitude and longitude as the positional information. For example, a mobile communication carrier may provide the user terminal 2 with positional information using base stations. In this case, the user terminal 2 acquires the latitude and longitude, address or zip code corresponding to the position of a base station near the user terminal 2 as the positional information. Alternatively, for example, the positional information may be able to be acquired by using a wireless local area network (LAN). For example, when receiving wireless signals from a plurality of access points, the user terminal 2 measures radio field intensity from each access point and acquires a service set identifier (SSID) of each access point. The user terminal 2 transmits information including the radio field intensity and the SSID to a predetermined server device (not shown). The server device stores the latitude and longitude of installation positions of the access points and other information. The server device uses the information received from the user terminal 2 to calculate the position of the user terminal 2 by, for example, triangulation.

Furthermore, each user terminal 2 has a function of photographing an image. For example, each user terminal 2 includes a digital camera including a charge-coupled device (CCD) sensor, a complementary metal oxide semiconductor (CMOS) sensor, or the like. The user terminal 2 stores the image data of an image photographed by the digital camera in a memory of the user terminal 2. Examples of an image that can be photographed include a photo and a video. Examples of a format of photo data include JPEG, RAW, and the like. The video may be either with sound or without sound. Examples of a container format of video data include MPEG2-TS, MP4, Flash Video (FLV), and the like. Examples of a format of the video itself include H.264, MPEG-2, and the like.

Here, each user terminal 2 has a function of adding photographing positional information indicating a position where an image was photographed to data of the photographed image. This function may be achieved, for example, by using geotagging according to an application program for image photographing. The photographing positional information includes, for example, the longitude and latitude of a photographing position. The photographing positional information may further include a time stamp indicating a photographing date and time of the image. Examples of a mode in which the photographing positional information with respect to the image data is added include a mode in which the photographing positional information is added to the image data as metadata, a mode in which a file of the photographing positional information associated with the image data is generated, and the like. In the case of a photo, for example, metadata in an exchangeable image file format (Exif), extensible metadata platform (XMP) format, or the like may be added to the data of the photo.

Note that the user terminal 2 used by a user who is an establisher of a channel may not have any of a function of acquiring photographing positional information, a function of photographing an image, and a function of adding photographing positional information to image data. In addition, the user terminal 2 used by the establisher may be a stationary terminal device such as a personal computer.

In the channel system S, the establisher designates a geographical region in order to create the channel. The designated region usually includes a place that is a subject about which information is exchanged in the channel, a place where an event that is a subject about which information is exchanged occurs, and the like. For example, the establisher can designate a region to include a specific store, facility, landmark, a sightseeing spot, or the like. In addition, the establisher can designate a region to include a place where specific people, animals, plants, or the like are present, and a place where a specific object or service is provided. In addition, the establisher can designate a region to include a place where a specific event is held.

Among users who use the channel system S, only a user who enters a designated region can join the channel. The user who has joined the channel acquires a right to post information to the channel. This right is continuously given to the member even after the member leaves the designated region. A user who has even slight interest in a thing within the designated region may or may not go into the region. However, an action of going to a certain place consumes the user's time and labor. Therefore, there is a high probability that the user who has gone into the designated region has no less than a certain degree of interest in a thing within the region. Therefore, it is possible to form a community from users who have no less than a certain degree of interest in a specific thing. The establisher may have the right to post information from the beginning regardless of whether the establisher has entered the designated region.

An example of a way of joining the channel includes making a request to the center server 1 for joining the channel by the user operating the user terminal 2 when the user terminal 2 is located within a region designated in the channel. The user terminal 2 provides the positional information of the user terminal 2 at that time to the center server 1, so that the center server 1 can confirm that the user is within the region. Therefore, the center server 1 can approve the user joining the channel. However, in this way, the user cannot join the channel after leaving the region once. For example, when the user desires to join the channel for a place to which the user went in the past, the user needs to go to the place again. When it is difficult to go to the place because the user cannot go out or for other reasons, the user cannot join the channel. In addition, for example, when an event related to the channel was held, the user went to a place where the event was held, but if the event is currently ended, the user has no reason to go to the place again.

Therefore, the channel system S regards photographing of an image with photographing positional information within the designated region as one of one or more conditions for joining the channel. The reason for that is that the photographing positional information added to the data of the photographed image can prove that the user was within the region. When going to a place of interest, the user possibly photographs an image at that place. Therefore, there is a possibility that the user has photographed an image in advance within a region corresponding to the channel that the user desires to join. In addition, also a user who knows this condition photographs an image when going to the place. Once the user stores image data in the user terminal 2, the user uploads the image data to the center server 1 even after going out of the region, whereby the user can join the channel.

However, it is relatively easy to falsify the photographing positional information added to the image data. In addition, it is also possible to obtain image data photographed by another person through web, instant message, email, recording medium, or other means. Therefore, there is a possibility that an illicit person who intends to join the channel appears even though the illicit person has not gone to a place related to the channel. The center server 1 determines joining for preventing such fraud.

Note that, as described above, there may be a way of joining the channel without using the photographed image. In the present embodiment, detailed description of such a way of joining will be omitted.

[2. Configuration of Center Server]

Figure 2:
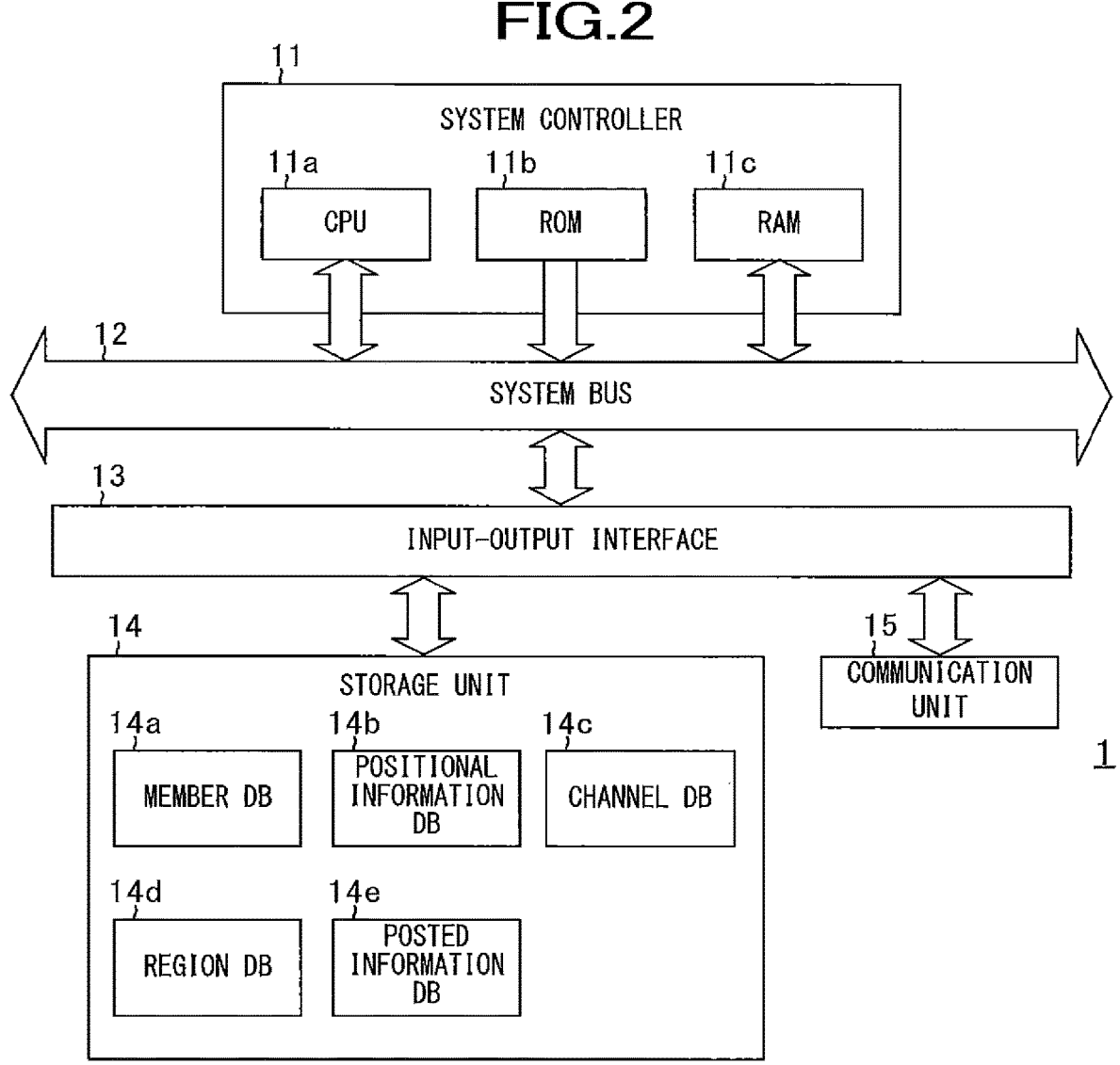
FIG. 2 is a block diagram showing one example of a schematic configuration of a center server according to one embodiment.

Next, the configuration of the center server 1 will be described with reference to FIGS. 2 and 3. FIG. 2 is a block diagram showing one example of the schematic configuration of the center server 1 according the present embodiment. As shown in FIG. 2, the center server 1 includes a system controller 11, a system bus 12, an input-output interface 13, a storage unit 14, and a communication unit 15. The system controller 11 and the input-output interface 13 are connected to each other via the system bus 12.

The system controller 11 includes a central processing unit (CPU) 11a, a read only memory (ROM) 11b, a random access memory (RAM) 11c, and the like.

The input-output interface 13 performs interface processing between the storage unit 14 and the communication unit 15, and the system controller 11.

The storage unit 14 includes, for example, a hard disk drive or the like. The storage unit 14 stores databases including a member DB 14a, a positional information DB 14b, a channel DB 14c, a region DB 14d, a posted information DB 14e. "DB" is an abbreviation for database.

Figure 3:
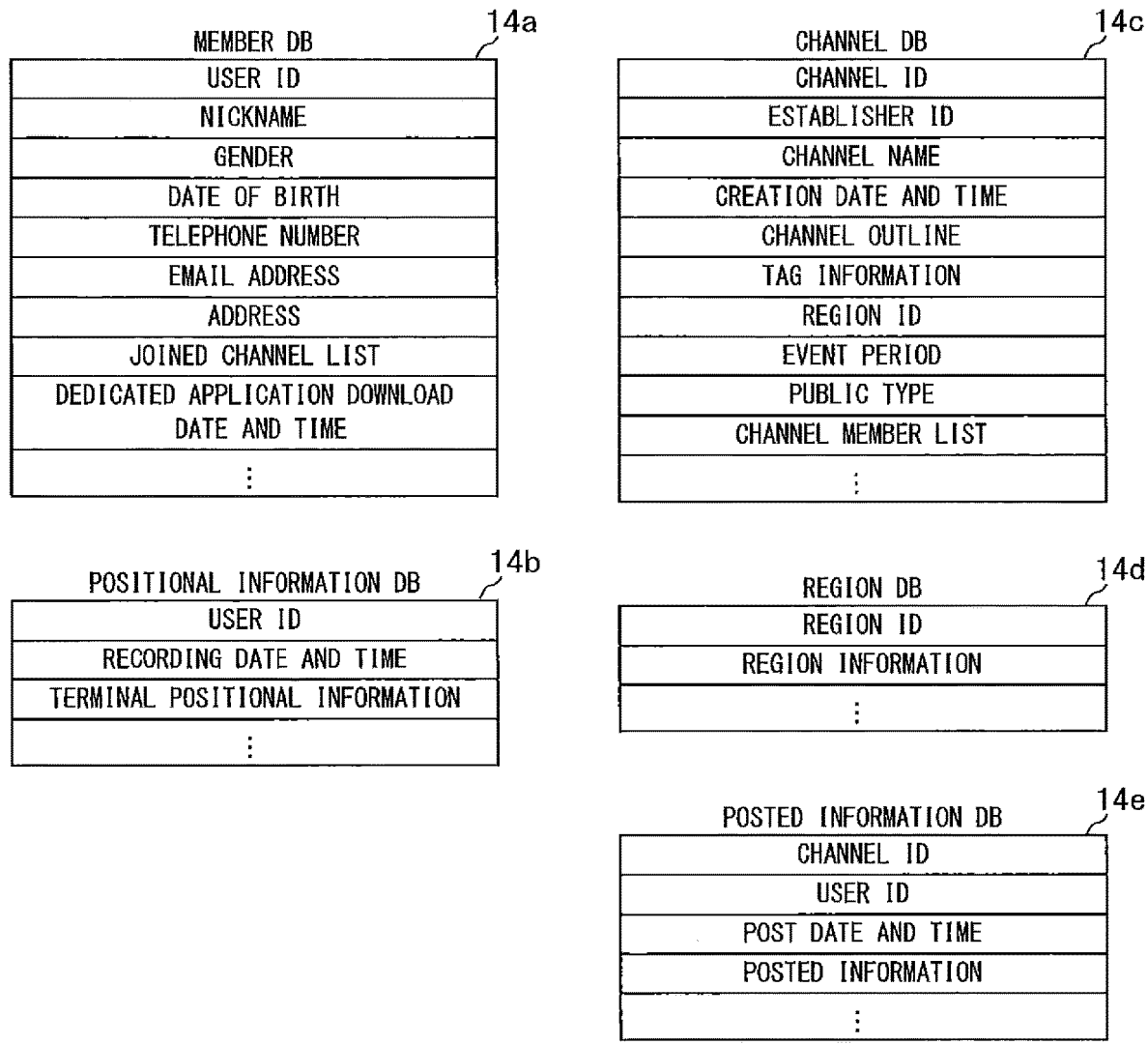
FIG. 3 is a diagram showing one example of details stored in databases.

FIG. 3 is a diagram showing one example of details stored in the databases. The member DB 14a stores member information about each user of the channel system S. Specifically, as the member information, information including a user ID, nickname, gender, date of birth, telephone number, email address, address, joined channel list, and dedicated application download date and time is stored in association with each other in the member DB 14a. The user ID is identification information for identifying the user. The notification channel list is, for example, a list of channel IDs of channels registered by the user. The channel ID is identification information for identifying the channel. The joined channel list is a list of channel IDs of the channels which the user has joined. The dedicated application download date and time indicates a date and time when the user terminal 2 of the corresponding user downloaded and installed the dedicated application. For example, when the user terminal 2 downloads the dedicated application from the center server 1, the center server 1 stores the dedicated application download date and time in association with the user ID of the user of that user terminal 2 in the member DB 14a.

The positional information of the user terminal 2 is stored for each user in the positional information DB 14b. Specifically, the user ID, recording date and time, and terminal positional information are stored in association with each other in the positional information DB 14b as the positional information. The user ID indicates the user who uses the user terminal 2. The recording date and time is the date and time when the positional information was recorded by the user terminal 2. In other words, the recording date and time is the date and time when the user terminal 2 was located at the place indicated by the terminal positional information. The terminal positional information may be, for example, the latitude and longitude indicating the position of the user terminal 2. Every time the center server 1 receives positional information from the same user terminal 2, the center server 1 adds the positional information to the positional information DB 14b.

The channel information about the created channel is stored for each channel in the channel DB 14c. Specifically, as the channel information, the channel ID, establisher ID, channel name, creation date and time, channel outline, tag information, region ID, event period, public type, channel member list, and the like are stored in association with each other in the channel DB 14c. Among these pieces of information, the channel name, creation date and time, channel outline, tag information, event period, and public type can be set by the establisher of the channel. The establisher ID is a user ID of the establisher. The creation date and time indicates a date and time when the channel is created. Basically, it is possible to join the channel, post information, and the like on or after the creation date and time. The tag information is a list of genres, keywords, and the like related to the channel. The region ID is identification information for identifying the region information indicating the region designated by the establisher. The establisher may be able to designate a plurality of regions. In this case, a plurality of region IDs is stored in the channel DB 14c, and a plurality of pieces of region information associated with these region IDs is stored in the region DB 14d. When the channel relates to a certain event, the event period indicates a period in which the event is held. The event period may or may not be stored in the channel DB 14c according to selection by the establisher. When the event period is designated, the region indicated by the region ID includes a place where a related event is held. The event period may be a specific time zone of one day, or may be a period of one or more days. The event period stored in the channel DB 14c does not need to completely match an actual event period. The event period may be business hours of a facility, store, or the like related to the channel. In this case, for example, the event period appears every day except for regular holidays. The public type indicates whether to show information posted to the channel to users who have not joined the channel. The channel member list is a list of user IDs of users having joined the channel. The channel member list may also include the user ID of the establisher.

The region information indicating the region designated by the establisher of the channel is stored in the region DB 14d. Specifically, the region ID, the region information, and the like are stored in association with each other for each designated region in the region DB 14d. The region corresponding to the channel may include a place where there is a thing regarding which information is exchanged in the channel. The region information indicates a region designated by the establisher of the channel. Examples of a shape of the region include a circle, ellipse, square, rectangle, rhomboid, and the like. For example, when the designated region is a circular region, the region information may include the latitude and longitude of the center point and a radius. The region information may include an address, facility name, building name, and landmark name that become the center point instead of the longitude and latitude of the center point. When the shape of the region is a shape other than a circle, the region information includes information corresponding to the shape. Alternatively, the region information may include the latitude and longitude of each line segment constituting the boundary of the region. Alternatively, the region information may include a name of a district or section.

The posted information DB 14d stores information posted to the channel. Specifically, the channel ID, user ID, posted date and time, posted information, and the like are stored in association with each other in the posted information DB 14d. The channel ID indicates a channel to which information is posted. The user ID indicates a posting person. The posted information is information that is posted. Examples of the posted information include still images, videos, sounds, and texts.

The storage unit 14 further stores various programs such as an operating system, a database management system (DBMS), and a server program. The server program is a program that causes the system controller 11 to execute various processes related to the channel system S. The server program may be, for example, acquired from another device via the Internet NW, or may be recorded in a recording medium such as a magnetic tape, an optical disk, or a memory card, and read via a drive device.

The communication unit 15 connects to the user terminals 2 via the network NW, and controls the communication state with these devices.

[3. Functional Outline of System Controller of Center Server]

Figure 4:
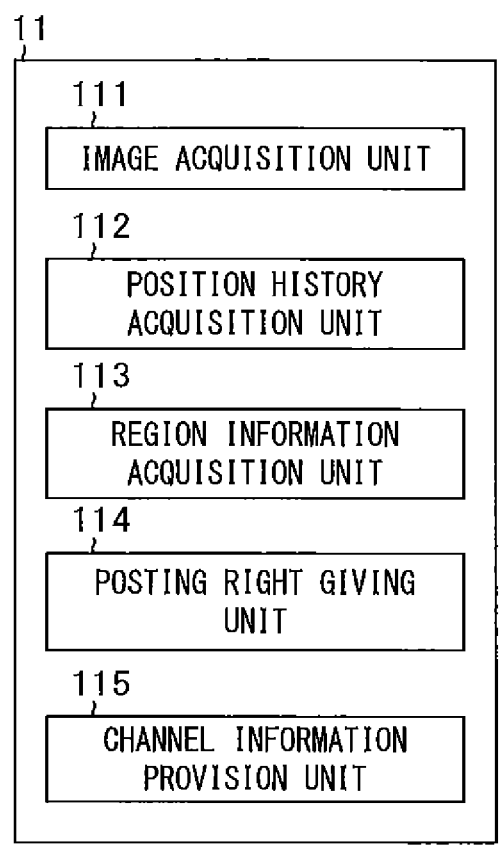
FIG. 4 is a diagram showing one example of functional blocks of a system controller of the center server according to one embodiment.

Next, a functional outline of the system controller 11 of the center server 1 will be described with reference to FIGS. 4 to 8B. FIG. 4 is a diagram showing one example of functional blocks of the system controller 11 of the center server 1 according to the present embodiment. The CPU 11a reads and executes various program codes included in the server program, whereby the system controller 11 functions as an image acquisition unit 111, a position history acquisition unit 112, a region information acquisition unit 113, a posting right giving unit 114, a channel information provision unit 115, and the like as shown in FIG. 4.

Figure 5:
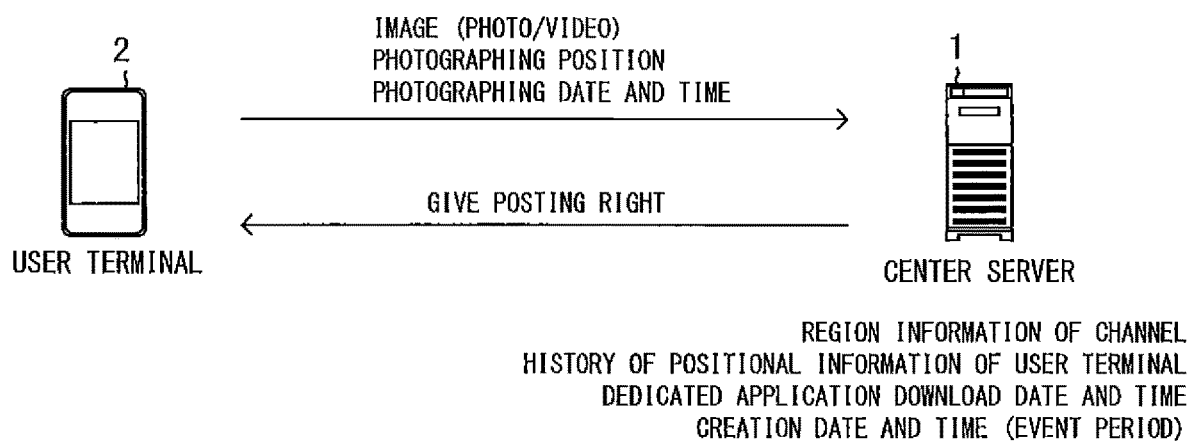
FIG. 5 is a diagram showing an example of information used for determining whether to approve joining a channel.

FIG. 5 is a diagram showing an example of information used for determining whether to approve joining the channel. The image acquisition unit 111 acquires, from the user terminal 2, data of the photographed image to which the photographing positional information indicating the photographing position of the image is added. For example, when the user desires to register joining a certain channel, the user selects the channel in the dedicated application. Then, the user selects upload of an image. The user terminal 2 displays a thumbnail or a list of stored images. When the user selects any of the images, if photographing positional information is added to the data of the image, the user terminal 2 transmits image data to which the photographing positional information is added to the center server 1 together with, for example, the user ID of the user who uses the user terminal 2 and the channel ID of the selected channel as shown in FIG. 5. In this way, the image acquisition unit 111 acquires the image data to which the photographing positional information is added. The image acquisition unit 111 may acquire image data to which the photographing positional information indicating the photographing position and the photographing date and time of the image is added.

The position history acquisition unit 112 acquires a history of terminal positional information indicating a position of the user terminal 2. For example, according to the dedicated application installed in the user terminal 2, each user terminal 2 acquires the terminal positional information of the user terminal 2 periodically in background (for example, every 5 minutes, every 10 minutes, or the like) using a GPS or the like. In addition, the user terminal 2 may acquire the terminal positional information at timing such as timing when the dedicated application is started. Every time the terminal positional information is acquired, the user terminal 2 acquires the current date and time as the recording date and time. The user terminal 2 transmits, to the center server 1, the positional information including the terminal positional information, the recording date and time, and the user ID of the user who uses the user terminal 2. When the user terminal 2 transmits the positional information in real time, the position history acquisition unit 112 may determine the recording date and time instead of the user terminal 2 determining the recording date and time. For example, the position history acquisition unit 112 may determine a reception date and time of the positional information as the recording date and time. The position history acquisition unit 112 may store the positional information transmitted from the user terminal 2 in the positional information DB 14b.

For example, when the image acquisition unit 111 acquires the image data from the user terminal 2, the position history acquisition unit 112 may acquire one or a plurality of pieces of the terminal positional information as the history of the terminal positional information from one or a plurality of pieces of the positional information stored in association with the user ID of the user who uses that user terminal 2 in the positional information DB 14b. The position history acquisition unit 112 may acquire a history of the positional information indicating a history of the position of the user terminal 2 together with a date and time. That is, the position history acquisition unit 112 may acquire one or a plurality of pieces of the positional information each including the terminal positional information and the recording date and time as a history of the positional information.

The region information acquisition unit 113 acquires the region information indicating the region designated in advance for the channel from the storage unit 14. For example, when the image acquisition unit 111 acquires the channel ID of the channel designated by the user together with the image data, the region information acquisition unit 113 acquires the region ID associated with the channel ID from the channel DB 14c. Then, the region information acquisition unit 113 acquires the region information associated with that region ID from the region DB 14d.

When the photographing position indicated by the photographing positional information added to the image data acquired by the image acquisition unit 111 is included in the region indicated by the region information acquired by the region information acquisition unit 113 and the photographing position corresponds to the position of the user terminal 2 identified on the basis of the history of the terminal positional information acquired by the position history acquisition unit 112, the posting right giving unit 114 executes processing for giving a right to post information to the channel to the user of the user terminal 2 that has transmitted the image data.

First, it is an essential condition for giving a posting right that the photographing position of the image is within the designated region. That is, this condition is that the image was photographed within a region where there is a thing regarding which information is exchanged in the channel. It is considered that the user goes into the designated region because the user has no less than a certain degree of interest in the thing in the region. Therefore, this condition is, for example, a condition for testing the degree of interest in the thing related to the channel. A plurality of regions may be associated with the channel. In this case, if the image is photographed in any one of these regions, this condition is satisfied.

As described above, since there is a possibility that fraud of the photographing position is done, the posting right giving unit 114 compares the photographing position with the history of the terminal positional information. A place where the user terminal 2 was likely to be actually located can be identified from the history of the terminal positional information. Therefore, if the photographing position corresponds to an actual position of the user terminal 2, there is a high possibility that the user actually photographed the image there.

The position of the user terminal 2 identified on the basis of the history of the terminal positional information may be a position where the user carrying the user terminal 2 was probably present. Specifically, the position of the user terminal 2 identified on the basis of the history of the terminal positional information may be a position itself of the user terminal 2 indicated by any of the terminal positional information included in the history. Alternatively, the position of the user terminal 2 identified on the basis of the history of the terminal positional information may be any point on a route along which the user terminal 2 (or the user) traveled and this route is estimated from a plurality of positions indicated by the history of the terminal positional information. This traveling route may be, for example, a route formed by connecting points indicated by the terminal positional information with a straight line according to order stored in the positional information DB 14b. Alternatively, the traveling route may be a route formed by a curved line connecting points indicated by the terminal positional information by spline interpolation or the like.

That the photographing position corresponds to the position of the user terminal 2 identified on the basis of the history of the terminal positional information means, for example, that there is a positional relationship between the photographing position and the position of the user terminal 2 indicating that there is a probability that the image was photographed at a point where the user terminal 2 was actually present. For example, when a distance between a position at the shortest distance from the photographing position among the positions of one or a plurality of user terminals 2 indicated by the history of the terminal positional information and the photographing position is equal to or less than a predetermined distance, the posting right giving unit 114 may determine that the photographing position corresponds to the position of the user terminal 2 identified on the basis of the history of the terminal positional information. Alternatively, when a distance between a point having the shortest distance from the photographing position among points on the traveling route estimated from the history of the terminal positional information and the photographing position is equal to or less than the predetermined distance, the posting right giving unit 114 may determine that the photographing position corresponds to the position of the user terminal 2 identified on the basis of the history of the terminal positional information.

The posting right giving unit 114 may use the photographing date and time included in the photographing positional information added to the image data and the recording date and time included in the positional information of the user terminal 2. For example, the posting right giving unit 114 may give the posting right when the photographing position indicated by the photographing positional information is included in the region indicated by the region information and the photographing position corresponds to a position corresponding to the photographing date and time indicated by the photographing positional information among the positions identified on the basis of the history of the positional information of the user terminal 2. The position corresponding to the photographing date and time indicated by the photographing positional information among the positions identified on the basis of the history of the positional information may be, for example, a point where there is a probability that the user terminal 2 was actually present at the time of photographing the image. For example, the position of the user terminal 2 corresponding to the photographing date and time may be a position indicated by the terminal positional information associated with the recording date and time closest to the photographing date and time among the recording dates and times included in the history of the positional information of the user terminal 2. Alternatively, on the basis of the traveling route estimated from the history of the positional information of the user terminal 2 and each recording date and time included in the history of the positional information, the posting right giving unit 114 may estimate a point where the user terminal 2 was present at a time point indicated by the photographing date and time on the traveling route, as the position of the user terminal 2 corresponding to the photographing date and time. By using the date and time, it is possible to determine a probability that the user was at or near the photographing position at a time when the image was photographed.

Not only when a place where the photographed image is uploaded to the center server 1 is within the designated region but also when that place where the photographed image is uploaded is outside of the region, it is possible to join the channel. A user who has no less than a certain degree of interest in a place or thing within the designated region, an event held within the region, or the like goes into the region. Therefore, the user who has no less than a certain degree of interest in a specific thing regarding which information is exchanged in the channel can join the channel. If it becomes clear that a user who attempts to join the channel has no less than a certain degree of interest in the thing, there is no need to limit the place where the image is uploaded.

Figure 6:
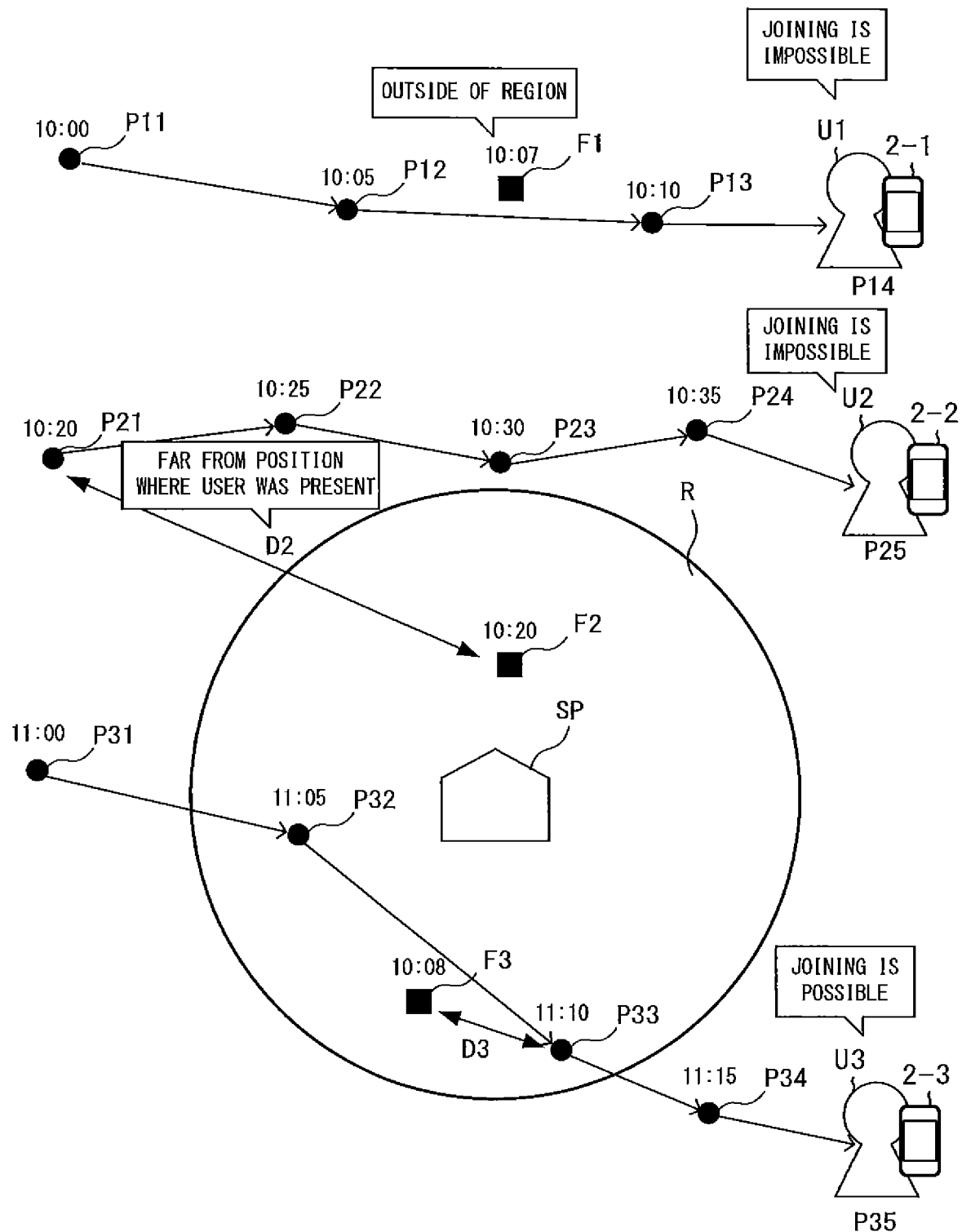
FIG. 6 is a diagram showing examples of determination as to whether a user can join a channel.

FIG. 6 is a diagram showing an example of determination as to whether a user can join a channel. For example, as shown in FIG. 6, a certain establisher designated a region R surrounding a ramen shop SP, registered region information, and created a channel C1 related to the ramen shop SP. It is assumed that each user terminal 2 acquires the positional information of the user terminal 2 every five minutes. A user U1 carrying a user terminal 2-1 is at a point P14 after going through points P12 and P13 from a point P11. Here, the user U1 uploaded a photo taken at a photographing point F1 and requested joining the channel C1. However, since the photographing point F1 is outside the region R, the user U1 cannot join the channel C1.

A user U2 carrying a user terminal 2-2 is at a point P25 after going through points P 22, 23, and 24 from a point P21. Here, the user U2 uploaded a photo taken at a photographing point F2 and requested joining the channel C1. The photographing point F2 is inside the region R. The photographing time of the photo is 10:20. The user U2 was at the point P21 at 10:20. The point P21 is far from the photographing point F2, and a distance D2 between the point P21 and the photographing point F2 is longer than a predetermined threshold distance. Therefore, it is not determined that the user U2 was at the photographing point F2 at the time of taking the photo. Therefore, the user U2 cannot join the channel C1. In this case, there is a possibility that positional information added to the photo has been falsified, or the user U2 has obtained the photo from someone. Note that the point P21 is outside the region R, but even if the point P21 is inside the region R, when the distance D2 is longer than the threshold distance, the user U2 cannot join the channel C1. Since joining the channel is enabled using image data, whether the user was present at the point where the image was taken (at the time when it was taken) is a problem.

A user U3 carrying a user terminal 2-3 is at a point P35 after going through points P32, P33, and P34 from a point P31. Here, the user U3 uploaded a photo taken at a photographing point F3 and requested joining the channel C1. The photographing point F3 is inside region R. The photographing time of the photo is 10:08. The user U3 was at the point P31 at 10:00, the point P32 at 10:05, the point P33 at 10:10, and the point P34 at 10:15. Then, the posting right giving unit 114 calculates, for example, a distance D3 between the point P33 whose recording time is closest to the photographing time and the photographing point F3. The distance D3 is shorter than the threshold distance. Therefore, the user U3 can join the channel C1.

Note that it is assumed that a user U4 carrying a user terminal 2-4 (not shown) acted together with the user U3. It is assumed that the user U4 acquired the photo taken by the user U3 at the point F3 by, for example, instant message, e-mail, or other means. Then, the user U4 uploaded the obtained photo and requested joining the channel C1. In this case, since a traveling route of the user U4 is approximately the same as a traveling route of the user U3, the posting right giving unit 114 may determine that the user U4 can also join the channel C1 for the same reason as in the case of the user U3. When a plurality of users is acting together, it is common that not all the users photograph images, but some of the users mainly photograph images.

Figure 7A:
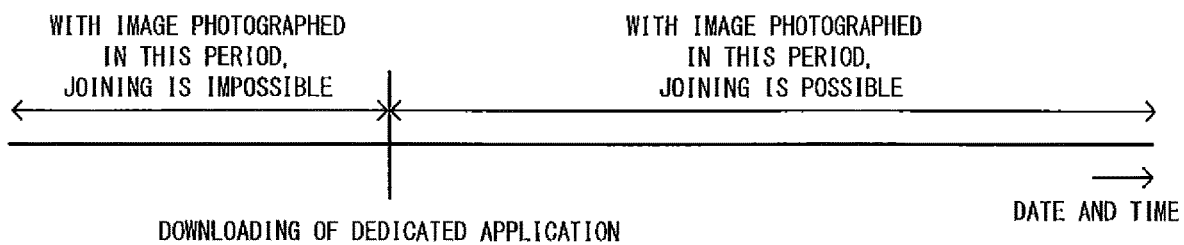
FIGS. 7A to 7C are diagrams each showing an example of a photographing date and time of an image that allows joining a channel.

The posting right giving unit 114 may limit the range of a photographing date and time of an image that allows joining the channel. For example, the posting right giving unit 114 may acquire the dedicated application download date and time of the user who requests joining the channel. Then, only when the photographing date and time is later than the acquired download date and time, the posting right giving unit 114 may give the posting right. As a result, a user who is interested in or has a curiosity about the channel system S can join the channel at the time of photographing an image. FIG. 7A is a diagram showing one example of the photographing date and time of an image that allows joining the channel. As shown in FIG. 7A, only with an image photographed when or after the dedicated application is downloaded, it is possible to join the channel.

Figure 7B:
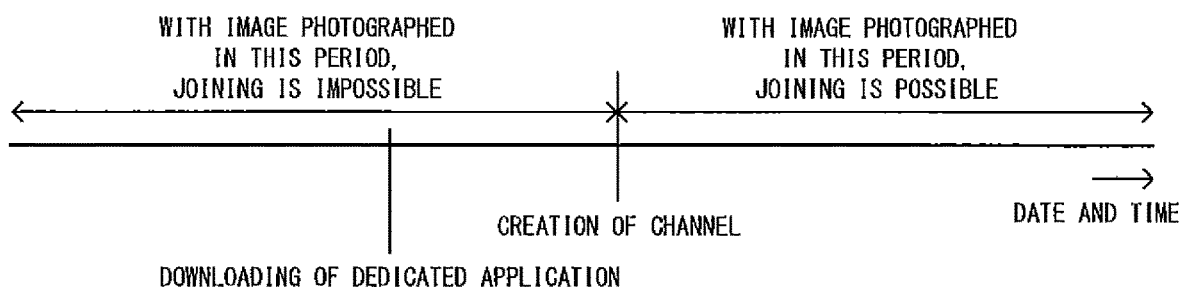

The posting right giving unit 114 may acquire period information indicating a predetermined period starting on or after the date and time when the channel is created. Then, only when the photographing date and time is included in the period indicated by the acquired period information, the posting right giving unit 114 may give the posting right. As a result, a user who is interested in or has a curiosity about the created channel can join the channel at the time of photographing an image. For example, the posting right giving unit 114 may acquire a channel creation date and time as the period information. Then, only when the photographing date and time is on or after the channel creation date and time, the posting right giving unit 114 may give the posting right. That is, when the image is photographed in a period in which the channel continues to exist, the posting right giving unit 114 may give the posting right. FIG. 7B is a diagram showing another example of the photographing date and time of an image that allows joining the channel. As shown in FIG. 7B, the user downloaded the dedicated application, and then the channel was created. In this case, the user can join the channel only with an image photographed when or after the channel is created. Note that, when the dedicated application is downloaded after the channel is created, the user can join the channel only with an image photographed when or after the dedicated application is downloaded.

Figure 7C:
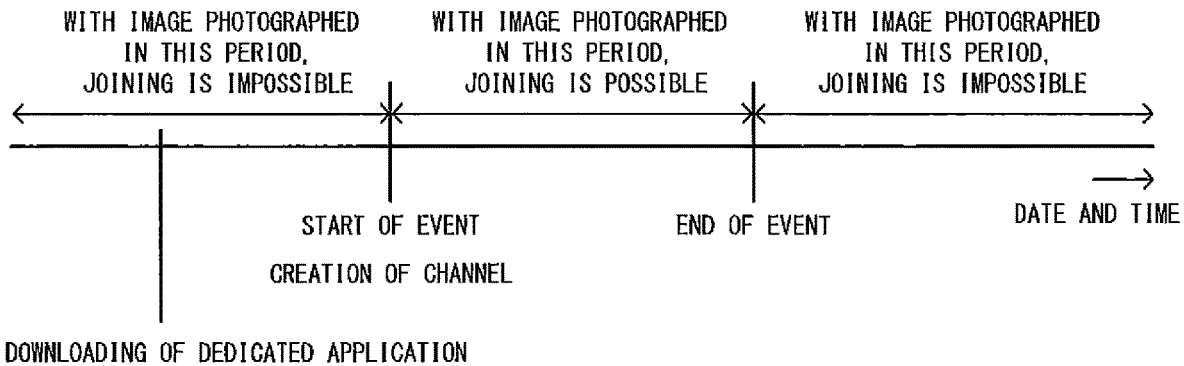

The posting right giving unit 114 may acquire the event period as the period information. Then, only when the photographing date and time is included in the event period, the posting right giving unit 114 may give the posting right. When the channel relates to some event, the establisher of the channel can designate a region for a place where the event is held and set an event period according to a period in which the event is held. Alternatively, when the channel relates to a facility, the establisher of the channel can designate a region for a place where the facility is located and set an event period according to the business hours of the facility. Therefore, by limiting the photographing date and time to within the event period, a user who has a probability of having participated in the event or a user who has a probability of having visited the facility within the business hours can join the channel. FIG. 7C is a diagram showing still another example of the photographing date and time of an image that allows joining the channel. For example, the establisher designates a region to include a place where an anime event is held and created an anime channel. In addition, the establisher designated a start date and time and end date and time of the event as a start date and time and an end date and time of the event period. The start date and time of the event is the same as the start date and time of the channel. A certain user downloaded the dedicated application before the start of the event. In this case, only with an image photographed within a period from the start until the end of the event, it is possible to join the channel. With an image photographed before the start or after the end of the event, it is impossible to join the channel.

Not only if a time when the photographed image is uploaded to the center server 1 is within the event period but also if the time when the photographed image is uploaded is after the end of the event, it is possible to join the channel. From the user going to a place at a time when something that can be of interest occurs it can be found that the user has no less than a certain degree of interest to that thing. For this reason, the event period can be designated. If it becomes clear that the user has no less than a certain degree of interest in a specific thing, there is no need to limit time when the image is uploaded.

When the posting right giving unit 114 gives a right to information to be posted to the channel as a result of the determination as described above, processing for giving the right may be, for example, associating the user ID of the user to whom the right to post information is given with the channel ID of the channel to which information can be posted. By referring to this association, it is possible to control whether to allow a specific user to post information to a specific channel. This association may be, for example, to add the user ID of the user who joins the channel to the channel member list associated with the channel ID in the channel DB 14c. Alternatively, the association may be to add the channel ID of the channel that the user has joined to the joined channel list associated with the user ID in the member DB 14a.

When executing the processing for giving the posting right, the posting right giving unit 114 may store, as posted information, the image data acquired from the user terminal 2 in the posted information DB 14e. There is possibly a user who desires to post an image that the user uploads to the center server 1 when joining the channel, though the image is normally not intended to be posted. Then, the posting right giving unit 114 may determine whether to handle the uploaded image data as the posted information according to selection by the user.

Figure 8A:
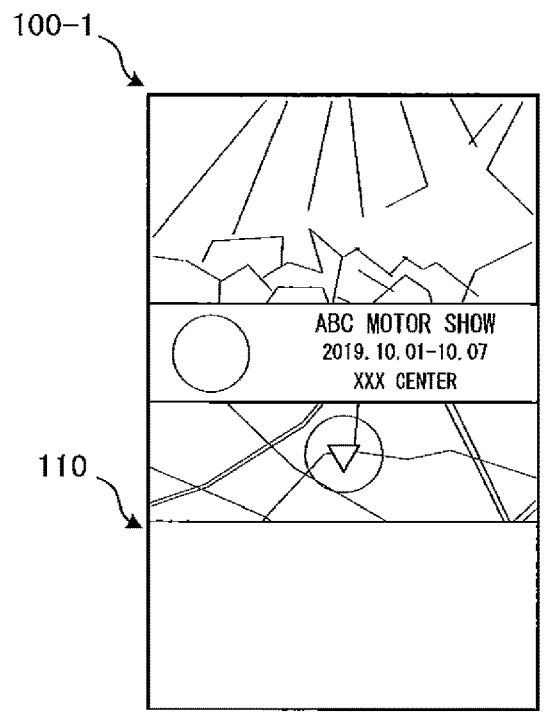
FIG. 8A is a diagram showing an example of a screen in the case of not having joined a channel.

The channel information provision unit 115 causes the user terminal 2 to display information about the channel. Examples of information to be displayed include a channel search result, channel information stored in the channel DB 14c, information posted to the channel, and the like. The channel information provision unit 115 shows the posted information stored in the posted information DB 14e to the corresponding channel. FIG. 8A is a diagram showing an example of a screen example in the case of not having joined the channel. For example, it may be possible to search for a channel by using the dedicated application. For example, it may be possible to input a genre, tag, keyword, address, district, and the like as a search condition. The channel information provision unit 115 searches for a channel that matches the search condition and transmits the search result to the user terminal 2. The user terminal 2 displays a list of found channels or displays icons or the like indicating the found channels in superimposition on a map. The user terminal 2 displays an in-channel screen 100-1 on the basis of the user selecting any channel from the found channels. The in-channel screen 100-1 includes a channel information region 110. The channel information region 110 originally displays various pieces of information about the channel. For example, in response to the user scrolling the screen, the information posted to the channel is displayed. However, when the user has not currently joined the channel, the channel information region 110 may be subjected to blurring processing in order to prevent the user from recognizing such information. The user cannot read the posted information or cannot post information.

Figure 8B:
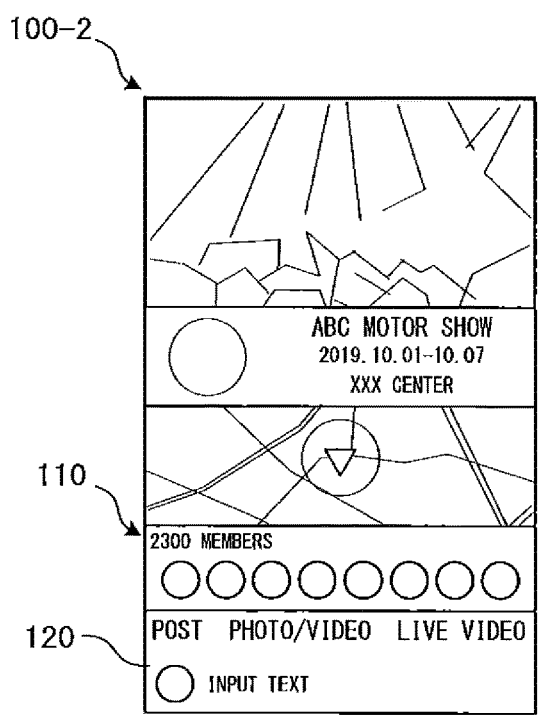
FIG. 8B is a diagram showing an example of a screen after joining the channel.

FIG. 8B is a diagram showing an example of a screen after joining the channel. After joining the channel, the user terminal 2 displays an in-channel screen 100-2. The in-channel screen 100-2 includes the channel information region 110. The channel information region 110 in this case clearly displays various pieces of information about the channel. In addition, the channel information region 110 includes a posting column 120. The posting column 120 is a region for inputting text as information to post and selecting a still image or video to post. The user can post information by operating the posting column 120.

The in-channel screen 100-1 shown in FIG. 8A is an example of a screen when the public type of the channel is "non-public". For a user who has not joined the channel whose public type is "public", the user terminal 2 may clearly display the information about the channel in the channel information region 110 while not displaying the posting column 120.

[4. Operation of Channel System]

Figure 9:
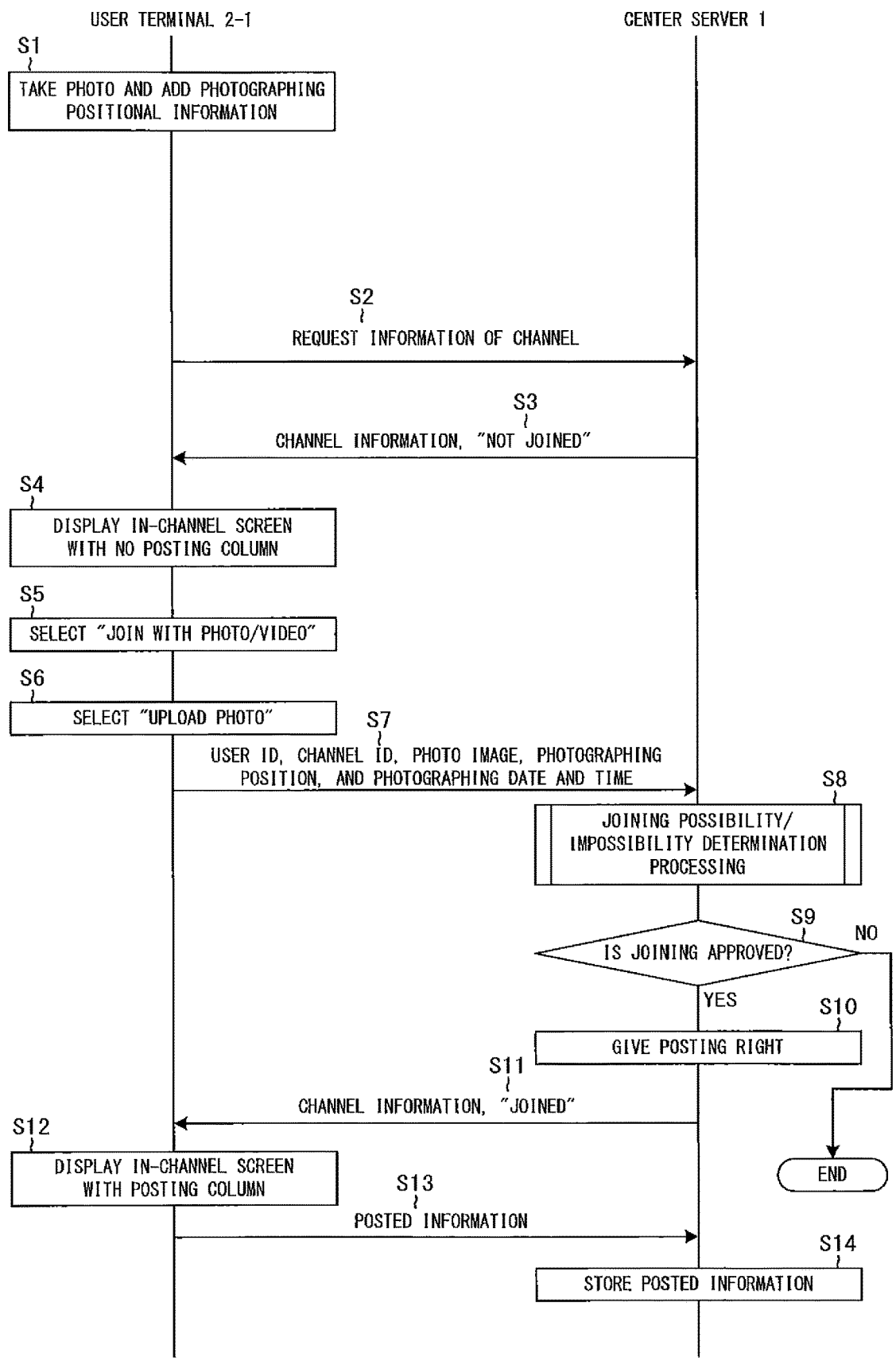
FIG. 9 is a sequence diagram showing one example of an operation of the channel system according to one embodiment.

Next, the operation of the channel system S will be described with reference to FIGS. 9 and 10. The system controller 11 executes processing of the center server 1 shown in FIG. 9 and processing shown in FIG. 10 according to the program code included in the server program. FIG. 9 is a sequence diagram showing one example of the operation of the channel system S according to the present embodiment.

As shown in FIG. 9, by the operation of the user U1 who has not joined the channel C1, the user terminal 2-1 takes a photo and stores data of the photo (step S1). At this time, the user terminal 2-1 acquires a position of the user terminal 2 and a current date and time as the photographing position and the photographing date and time. Then, the user terminal 2-1 adds photographing positional information including the photographing position and the photographing date and time to the data of the photo. Then, for example, after several hours or several days, the user U1 starts the dedicated application and searches for and selects the channel C1. In response to the selection of the channel C1, the user terminal 2-1 transmits a request for an in-channel screen to the center server 1 (step S2). This request includes the user ID of the user U1 and the channel ID of the selected channel C1.

When receiving the request for the in-channel screen, the channel information provision unit 115 of the center server 1 acquires information associated with the channel ID of the channel C1 from the channel DB 14c and the posted information DB 14e. In addition, the center server 1 determines whether the channel member list associated with the channel ID of the selected channel C1 includes the user ID of the user U1. Since the channel member list does not include the user ID of the user U1, the center server 1 transmits the acquired information about the channel C1 and a joining status indicating "not joined" to the user terminal 2-1 (step S3). The user terminal 2-1 displays the in-channel screen 100-1 on the basis of the information received from the center server 1 (step S4). Here, since the joining status is "not joined", the user terminal 2-1 does not display the posting column 120. Therefore, the user U1 cannot post information to the channel C1.

Here, the user U1 selects "join with photo/video" for the channel C1 from a menu of the dedicated application (step S5). In response to this, the user terminal 2-1 displays a menu including "upload photo", "upload video", and the like. The user U1 selects "upload photo" from the menu (step S6). In response to this selection, the user terminal 2-1 displays a list of still images stored in the user terminal 2-1. The user selects the photo taken in step S1 from the list. In response to this, the user terminal 2 transmits a joining request including the user ID of the user U1, the channel ID of the channel C1, the selected photo data, and the photographing positional information to the center server 1 (step S7).

The center server 1 that has received the joining request executes the joining possible or impossible determination processing (step S8). FIG. 10 is a flowchart showing one example of the joining possible or impossible determination processing by the system controller 11 of the center server 1 according to the present embodiment.

As shown in FIG. 10, the region information acquisition unit 113 acquires, from the channel DB 14c, the region ID and the creation date and time associated with the channel ID included in the joining request. Then, the region information acquisition unit 113 acquires region information associated with the acquired region ID from the region DB 14d (step S101). Next, the position history acquisition unit 112 acquires a history of the positional information associated with the user ID included in the joining request from the positional information DB 14b. In addition, the posting right giving unit 114 acquires the dedicated application download date and time associated with the user ID from the member DB 14a (step S102).

Next, the posting right giving unit 114 determines whether the photographing position indicated by the photographing positional information added to the photo data included in the joining request is within the region indicated by the acquired region information (step S103). For example, the posting right giving unit 114 calculates a distance from a center point included in the region information to the photographing position. When the calculated distance exceeds a radius included in the region information, the posting right giving unit 114 determines that the photographing position is not within the region (step S103: NO). In this case, the posting right giving unit 114 determines to deny joining the channel (step S111).

On the other hand, when the calculated distance is equal to or less than the radius included in the region information, the posting right giving unit 114 determines that the photographing position is within the region (step S103: YES). In this case, the posting right giving unit 114 determines a position of the user terminal 2 at the time of photographing on the basis of the history of the acquired positional information and the photographing date and time (step S104). For example, the posting right giving unit 114 may identify a recording date and time closest to the photographing date and time among the recording dates and times included in the history of the positional information. Then, the posting right giving unit 114 may determine the position indicated in the terminal positional information associated with the identified recording date and time as the position of the user terminal 2 at the time of photographing. Alternatively, the posting right giving unit 114 may estimate the traveling route of the user terminal 2 on the basis of the history of the positional information. Then, for example, the posting right giving unit 114 may determine the position of the user terminal 2 at the time of photographing to be a position where a point arrives after the point moves, along the estimated traveling route, a distance corresponding to a difference between the photographing date and time and the recording date and time from the position indicated in the terminal positional information associated with the recording date and time closest to the photographing date and time.

Next, the posting right giving unit 114 determines whether the distance between the photographing position and the determined position of the user terminal 2 is equal to or less than the predetermined distance (step S105). When the distance between the photographing position and the position of the user terminal 2 is not equal to or less than the predetermined distance (step S105: NO), the process proceeds to step S111.

On the other hand, when the distance between the photographing position and the position of the user terminal 2 is equal to or less than the predetermined distance (step S105: YES), the posting right giving unit 114 determines whether the photographing date and time indicated by the photographing positional information added to the photo data included in the joining request is on or after the download date and time of the dedicated application (step S106). When the photographing date and time is not on or after the download date and time (step S106: NO), the process proceeds to step S111.

On the other hand, when the photographing date and time is on or after the download date and time (step S106: YES), the posting right giving unit 114 determines whether there is an event period in the channel information stored in association with the channel ID included in the joining request in the channel DB 14c (step S107). When there is no event period (step S107: NO), the posting right giving unit 114 determines whether the photographing date and time is on or after the creation date and time (step S108). When the photographing date and time is not on or after the creation date and time (step S108: NO), the process proceeds to step S111. On the other hand, when the photographing date and time is on or after the creation date and time (step S108: YES), the posting right giving unit 114 determines to approve the joining in the channel (step S110).

On the other hand, when there is an event period (step S107: YES), the posting right giving unit 114 determines whether the photographing date and time is within the event period (step S109). When the photographing date and time is not within the event period (step S109: NO), the process proceeds to step S111. On the other hand, when the photographing date and time is within the event period (step S109: YES), the process proceeds to step S110. When step S110 or S111 is executed, the joining possible or impossible determination processing ends.

As shown in FIG. 10, when the joining possible or impossible determination processing ends, the posting right giving unit 114 determines whether the joining is approved in the joining possible or impossible determination processing (step S9). When the joining is denied (step S9: NO), the posting right giving unit 114 transmits a message that the joining is impossible to the user terminal 2-1, and processing shown in FIG. 9 ends.

On the other hand, when the joining is approved (step S9: YES), the posting right giving unit 114 executes processing for giving aright to post information to the user U1 (step S10). For example, the posting right giving unit 114 adds the user ID of the user U1 to the channel member list stored in association with the channel ID included in the joining request in the channel DB 14c. In addition, the posting right giving unit 114 may add the channel ID to the joined channel list stored in association with the user ID of the user U1 in the member DB 14a.

Next, the channel information provision unit 115 acquires information associated with the channel ID of the channel C1 that the user U1 has joined from the channel DB 14c and the posted information DB 14e. In addition, the channel information provision unit 115 determines whether the channel member list associated with the channel ID of the selected channel C1 includes the user ID of the user U1. Since the channel member list associated with the channel ID of the channel C1 includes the user ID of the user U1, the channel information provision unit 115 transmits the acquired information about the channel C1 and a joining status indicating "joined" to the user terminal 2-1 (step S11). The user terminal 2-1 displays the in-channel screen 100-2 on the basis of the information received from the center server 1 (step S12). Here, since the joining status is "joined", the user terminal 2-1 displays the posting column 120. Thereafter, the user U1 inputs information to post by operating the posting column 120. The user terminal 2-1 transmits the input information to the center server 1 as posted information (step S13). The center server 1 stores the received posted information in association with the channel ID of the channel C1 in the posted information DB 14e (step S14).

As described above, according to the present embodiment, the center server 1 acquires, from the user terminal 2, the photographed image to which the photographing positional information indicating the photographing position of the image is added. In addition, the center server 1 acquires the history of the positional information indicating the history of the position of the user terminal 2. In addition, the center server 1 acquires the region information indicating the region designated in advance for the channel from the storage unit 14. In addition, when the photographing position indicated by the photographing positional information added to the acquired image is included in the region indicated by the acquired region information, and the photographing position corresponds to the position of the user terminal 2 identified on the basis of the history of the acquired positional information, the center server 1 executes processing for giving a right to post information to the channel to the user of the user terminal 2.

The image to which the photographing positional information is added, the history of the positional information, and the region information are acquired. The photographing positional information added to the image indicates a position at which the image is assumed to have been photographed. The history of the positional information indicates a history of where the terminal device was located. The region indicated by the region information includes, for example, a place where there is a thing regarding which information is exchanged in the community. Then, when the photographing position of the image is within the designated region and the photographing position corresponds to the position of the user terminal 2 identified on the basis of the history of the positional information, the posting right is given. Therefore, one of one or more conditions for giving the posting right is that the image was photographed within a region where there is a thing regarding which information is exchanged in the channel. It is considered that the user goes into the designated region because the user has no less than a certain degree of interest in the thing in the region. Therefore, this condition is, for example, a condition for testing the degree of interest in a thing related to the channel. Another condition for giving the posting right is that there is a probability that the user was actually at or near the position where the image is assumed to have been photographed. By comparing the photographing position of the image with the position of the user terminal 2, it is possible to prevent fraud such as photographing falsification of the positional information added to the image. Therefore, by using the image to which the positional information is added, a user having high certainty of having gone to a place associated with the channel can join the channel.

Here, the center server 1 may acquire the image to which the photographing positional information indicating the photographing position and the photographing date and time of the image is added. In addition, the center server 1 may acquire the history of positional information indicating the history of the position of the user terminal 2 together with dates and times. In addition, the center server 1 may give the posting right when the photographing position indicated by the positional information is included in the region indicated by the region information and the photographing position corresponds to a position of the user terminal 2 corresponding to the photographing date and time indicated by the positional information among positions identified on the basis of the history of the positional information and. In this case, the image to which the photographing positional information indicating also the date and time when the image was photographed is added is acquired. In addition, the history of the positional information indicating the date and time when the user terminal 2 was present is acquired in association with the position of the user terminal 2. Then, when the photographing position of the image corresponds to the position of the user terminal 2 corresponding to the photographing date and time, the posting right is given. Therefore, only when there is a probability that the user was actually at or near the position where the image is assumed to have been photographed at time when the image was photographed, the posting right can be given. Therefore, it is possible to more reliably prevent fraud such as falsification of the positional information added to the image.

Here, the center server 1 may acquire a dedicated application download date and time indicating a date and time when the user terminal 2 downloaded the application used to post information to the channel. In addition, only when the photographing date and time is later than the acquired dedicated application download date and time, the center server 1 may give the posting right. In this case, only when the image is photographed when or after the user terminal 2 downloaded the application for posting information to the channel, the posting right is given. Therefore, a user who is interested in the channel system S can join the channel at the time of photographing an image.

In addition, the center server 1 may acquire the period information indicating a predetermined period starting on or after the date and time when the channel is created. In addition, only when the photographing date and time is included in the period indicated by the acquired period information, the center server 1 may give the posting right. In this case, only when the image is photographed within the predetermined period starting on or after the date and time when the channel is created, the posting right is given. Therefore, a user who is interested in or has a curiosity about a created channel or a thing related to the channel can join the channel at the time of photographing an image.

In addition, when processing in which a posting right is given is executed, the center server 1 may show the image acquired from the user terminal 2 to the channel as the information posted by the user. In this case, in response to the user joining the channel, the image transmitted by the user can be directly posted on the channel.

The invention claimed is:

1. A posting right giving device, comprising:
   at least one memory configured to store thereon computer program code; and
   at least one processor configured to access the at least one memory and operate according to the computer program code, the computer program code comprising:
   image acquisition code configured to cause at least one of the at least one processor to acquire, from a terminal device, a photographed image to which positional information indicating a photographing position of the image is added;
   position history information acquisition code configured to cause at least one of the at least one processor to acquire position history information indicating a history of positions of the terminal device;
   region information acquisition code configured to cause at least one of the at least one processor to acquire, from a storage, region information indicating a region designated in advance for a community where information can be posted and posted information can be received via a network; and
   giving code configured to cause at least one of the at least one processor to execute, on the basis of determination that the photographing position indicated by the positional information added to the acquired image is included in the region indicated by the acquired region information and the photographing position corresponds to a position of the terminal device identified on the basis of the acquired position history information, processing for giving a user of the terminal device a right to post information to the community.

2. The posting right giving device according to claim 1, wherein
   the image acquisition code is configured to cause at least one of the at least one processor to acquire the image to which the positional information indicating the photographing position and a photographing date and time of the image is added,
   the position history information acquisition code is configured to cause at least one of the at least one processor to acquire the position history information indicating the history of the positions of the terminal device together with dates and times, and
   the giving code is configured to cause at least one of the at least one processor to give the right on the basis of the determination that the photographing position indicated by the positional information is included in the region indicated by the region information and the photographing position corresponds to the position of the terminal device corresponding to the photographing date and time indicated by the positional information among positions identified on the basis of the position history information.

3. The posting right giving device according to claim 2, further comprising
   download date and time code configured to cause at least one of the at least one processor to acquire download date and time information indicating a date and time when the terminal device downloaded an application used to post information to the community, wherein
   the giving code is configured to cause at least one of the at least one processor to give the right on the basis of the determination and further determination that the photographing date and time is later than the date and time indicated by the acquired download date and time information.

4. The posting right giving device according to claim 2, further comprising
   period information acquisition code configured to cause at least one of the at least one processor to acquire period information indicating a predetermined period starting on or after a date and time when the community is created, wherein
   the giving code is configured to cause at least one of the at least one processor to give the right on the basis of the determination and further determination that the photographing date and time is included in the period indicated by the acquired period information.

5. The posting right giving device according to claim 1, further comprising
   showing code is configured to cause at least one of the at least one processor to show the acquired image as information posted by the user to the community on the basis of determination that the processing for giving the right is executed.

6. A posting right giving method performable by a computer, the method comprising:
   acquiring, from a terminal device, a photographed image to which positional information indicating a photographing position of the image is added;
   acquiring position history information indicating a history of positions of the terminal device;
   acquiring, from a storage, region information indicating a region designated in advance for a community where information can be posted and posted information can be received via a network; and executing, on the basis of determination that the photographing position indicated by the positional information added to the acquired image is included in the region indicated by the acquired region information and the photographing position corresponds to a position of the terminal device identified on the basis of the acquired position history information, processing for giving a user of the terminal device a right to post information to the community.

7. A non-transitory computer readable medium storing thereon a posting right giving program, the posting right giving program causing a computer to:

acquiring, from a terminal device, a photographed image to which positional information indicating a photographing position of the image is added;

acquiring position history information indicating a history of positions of the terminal device;

acquiring, from a storage, region information indicating a region designated in advance for a community where information can be posted and posted information can be received via a network; and executing, on the basis of determination that the photographing position indicated by the positional information added to the acquired image is included in the region indicated by the acquired region information and the photographing position corresponds to a position of the terminal device identified on the basis of the acquired position history information, processing for giving a user of the terminal device a right to post information to the community.

\* \* \* \* \*